United States Patent [19]

Fralick et al.

[11] Patent Number: 4,876,818

[45] Date of Patent: Oct. 31, 1989

[54] MARKED FISHING NET AND METHOD FOR MAKING SAME

[75] Inventors: Richard D. Fralick, East Sound; Philip A. Ekstrom, Shaw Island, both of Wash.

[73] Assignee: Northwest Marine Technology, Inc., Shaw Island, Wash.

[21] Appl. No.: 190,139

[22] Filed: May 4, 1988

[51] Int. Cl.⁴ .............................................. A01K 71/00
[52] U.S. Cl. ........................................... 43/7; 28/166; 29/428; 43/14; 57/206; 428/373
[58] Field of Search ..................... 43/7, 9, 14; 57/200, 57/206; 28/166; 428/373; 29/428

[56] References Cited

U.S. PATENT DOCUMENTS

| | | | |
|---|---|---|---|
| 1,059,631 | 4/1913 | Popovics . | |
| 1,980,452 | 11/1934 | Tice | 43/14 |
| 2,031,267 | 2/1936 | Koon | 57/233 |
| 2,310,702 | 2/1943 | Ljubetich | 43/14 |
| 3,003,155 | 10/1961 | Mielzynski et al. | 3/1 |
| 3,128,744 | 4/1964 | Jefferts et al. | 119/3 |
| 3,174,458 | 6/1963 | Levy et al. | 119/3 |
| 3,313,301 | 4/1967 | Jefferts et al. | 128/330 |
| 3,545,405 | 12/1970 | Jefferts et al. | 119/3 |
| 3,820,545 | 6/1974 | Jefferts et al. | 119/3 |
| 3,952,438 | 4/1976 | Propst et al. | 40/300 |
| 3,987,576 | 10/1976 | Strader | 43/42.19 |
| 4,115,988 | 9/1978 | Nakagawa | 57/206 |
| 4,233,964 | 11/1980 | Jefferts et al. | 128/330 |
| 4,397,142 | 8/1983 | Bingham | 57/238 |
| 4,489,542 | 12/1984 | Buzano | 57/206 |
| 4,527,383 | 7/1985 | Bingham | 57/200 |

FOREIGN PATENT DOCUMENTS

| | | |
|---|---|---|
| 1250186 | 9/1967 | Fed. Rep. of Germany . |
| 943161 | 3/1949 | France . |
| 7603552 | 2/1976 | France . |
| 1111710 | 9/1984 | U.S.S.R. . |

Primary Examiner—Gene P. Crosby
Attorney, Agent, or Firm—Kenyon & Kenyon

[57] ABSTRACT

A fishing net includes a cord having a multiplicity of strands including an identification strand marked at spaced intervals with sequential numerical codes. The preselected strand is substantially inextricably incorporated in the cord so that the preselected strand extends along the length thereof. The cord is in turn incorporated in the net so that the cord extends substantially from one end of the net to an opposite thereof. The cord has ends located at readily accessible preselected points relative to the net so that a smallest numerical code and a largest numerical code on the cord are easily determinable upon visual inspection of the net.

53 Claims, 2 Drawing Sheets

MARKED FISHING NET AND METHOD FOR MAKING SAME

BACKGROUND OF THE INVENTION

This invention relates to the marking of fishing nets for identification purposes. More particularly, this invention relates to a method of manufacturing a marked fishing net and a method of manufacturing an identification cord incorporated into the net. In addition, this invention relates to a marked fishing net and marking cord produced by methods in accordance with the present invention.

Discarded fishing nets have become an international problem of increasing seriousness. Fishing nets or portions thereof lost at sea or cast adrift by their owners frequently ensnare dolphins and other mammals causing their eventual demise, as well as fish, which consequently destroys fish resources, and are frequently washed ashore along beaches from Japan and California to the Aleutian islands. International negotiations are currently being undertaken towards treaties directed at solving the problem of discarded or lost fishing gear. However, efforts to obviate the problems caused by fishing gear lost or discarded at sea seem to require some way of identifying the owner of gear found adrift. Clearly, it is necessary to apply a distinctive identifying mark to fishing nets as they are being manufactured or at some other point prior to the placement of the fishing nets into service. The marked fishing nets must then be registered to the respective owners. The identifying marks must be permanent and not readily removed by an owner who may wish to illegally discard his damaged gear. Furthermore, the identifying marks must be easily read by an inspector who wishes to verify that all gear aboard a boat is indeed registered to the owner. An additional requirement of the identifying marks is that they must remain associated with any major fragment of fishing gear which may be discovered at a later time. The cost of creating, applying and reading the identifying marks should be minimized, as well as the extent of change required in the existing fishing gear supply industry to incorporate the identifying marks.

An object of the present invention is to provide a method of manufacturing a fishing net provided with identifying marks.

Another, more particular, object of the present invention is to provide such a method wherein the identifying marks are permanent and not readily removable from the fishing net or any substantial portion thereof.

Another particular object of the present invention is to provide such a method wherein the identifying marks associated with a new net are readily determinable.

Yet another particular object of the present invention is to provide such a method which is inexpensive and easy to implement.

A further object of the present invention is to provide a fishing net provided with substantially permanent identifying marks throughout essentially its entire length.

SUMMARY OF THE INVENTION

The present invention is directed to a method of marking any fishing gear which includes cordage as an integral part. Central to the method of manufacturing a marked fishing net is a sequence of numerical codes incorporated in a cord, preferably during manufacture thereof.

A method of manufacturing fishing gear comprises, in accordance with the present invention, the steps of (a) marking a preselected strand at spaced intervals with sequential numerical codes or numbers, (b) substantially inextricably incorporating the preselected strand in a cord of a multiplicity of strands so that the preselected strand extends along the length of the cord, (c) incorporating the cord in a net so that the cord extends substantially from one end of the net to an opposite end thereof, and (d) locating ends of the cord at readily accessible preselected points relative to the net so that a smallest numerical code and a largest numerical code on the cord are easily determinable upon visual inspection of the net.

Pursuant to another feature of the present invention, a method of manufacturing fishing gear comprises the steps of (a) providing a cord of a multiplicity of strands including a preselected strand marked at spaced intervals with sequential numerical codes or numbers, the preselected strand being substantially inextricably incorporated in the cord so that the preselected strand extends along the length of the cord, (b) incorporating the cord in a net so that the cord extends substantially from one end of the net to an opposite end thereof, and (c) locating ends of the cord at readily accessible preselected points relative to the net so that a smallest numerical code and a largest numerical code on the cord are easily determinable upon visual inspection of the net.

In accordance with the present invention, a method of manufacturing a cord to be incorporated in fishing gear comprises the steps of (a) marking a preselected strand at spaced intervals with sequential numerical codes or numbers, and (b) substantially inextricably incorporating the preselected strand in a cord of a multiplicity of strands so that the preselected strand extends along the length of the cord, the step of inextricably incorporating including the step of connecting the preselected strand to at least one other strand in the cord.

Fishing gear in accordance with the present invention comprises a net having a cord of a multiplicity of strands including a preselected strand marked at spaced intervals with sequential numerical codes or numbers. The preselected strand is substantially inextricably incorporated in the cord so that the preselected strand extends along the length of the cord. The cord is incorporated in the net so that the cord extends substantially from one end of the net to an opposite end thereof. The cord has ends located at readily accessible preselected points relative to the net so that a smallest numerical code and a largest numerical code on the cord are easily determinable upon visual inspection of the net.

A cord to be incorporated in fishing gear comprises, in accordance with the present invention, a multiplicity of strands including a preselected strand marked at spaced intervals with sequential numerical codes or numbers. The preselected strand is substantially inextricably incorporated in the cord so that the preselected strand extends along the length of the cord. Specifically, the preselected strand is connected to at least one other strand in the cord, or incorporated in the cord by braiding or twisting.

Pursuant to particular features of the present invention, the intervals at which the numerical codes appear are equally spaced along the preselected strand or unequally spaced at intervals subject to a maximum limit, while the numerical codes may take the form of color codes or decimal digits.

Pursuant to further features of the present invention, the numerical codes on the preselected strand may be each associated with a common mark placed with the numerical codes on the preselected strand at the spaced intervals therealong. The common mark exemplify constitutes a trademark.

Advantageously, the preselected strand is connected to another strand of the cord, such as a load bearing strand, by being woven under substrands of the load bearing strand of the cord.

In a specific form of the cord of the instant invention, the preselected strand takes the form of a tape, the numerical codes being indelibly marked, such as hot stamped, into the tape. The cord may form a head line of the net, in which case the cord is sewn into the net so that the cord becomes an integral part of the net.

DETAILED DESCRIPTION

Figure 1:
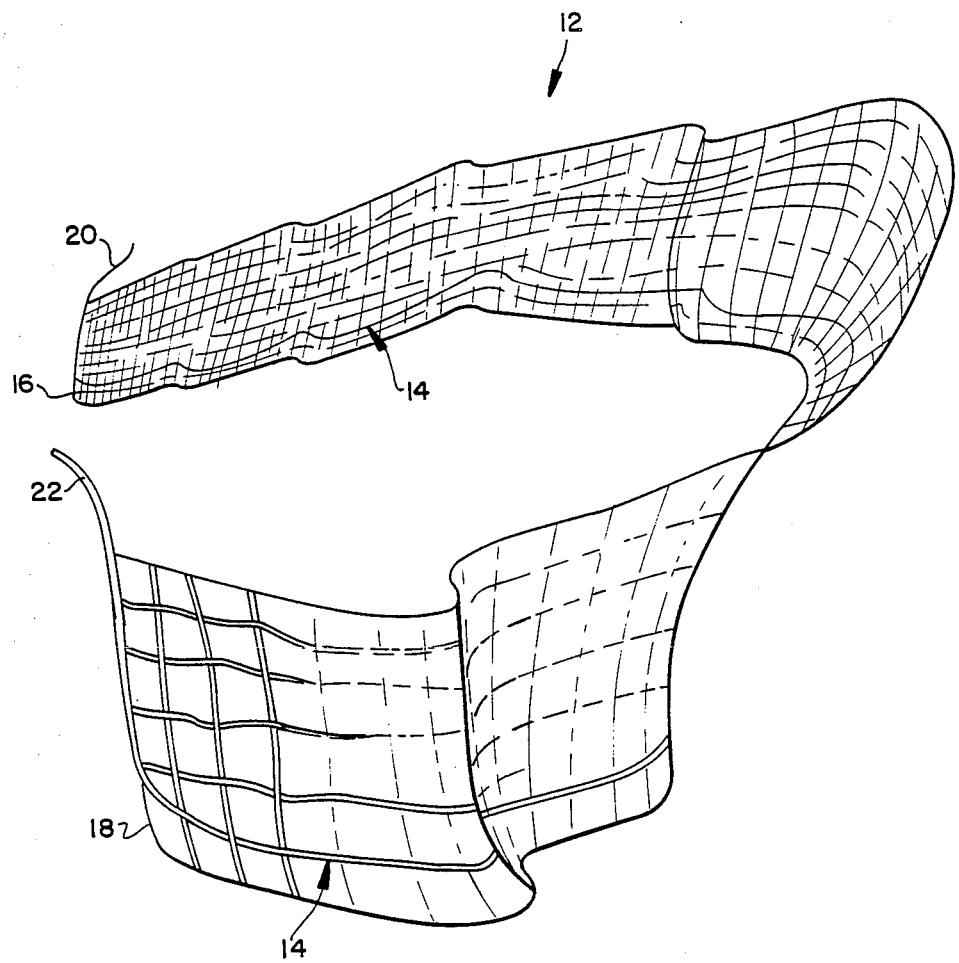
FIG. 1 is a schematic perspective view of a fishing net in accordance with the present invention, wherein only a portion of the cords of the net have been illustrated for purposes of simplicity.

As illustrated in FIG. 1, a fishing net 12 in accordance with the present invention has a cord 14 extending from one end 16 of the net to an opposite end 18 thereof and having opposite ends 20 and 22 located at readily excessible points so that numerical codes marked on the cord at the ends thereof are easily readable by a net inspector. As depicted in FIG. 1, ends 20 and 22 are advantageously disposed along ends or edges 16 and 18 of net 12. Cord 14 is preferably sewn into net 12 so that the cord forms an integral part of the net.

Figure 2:
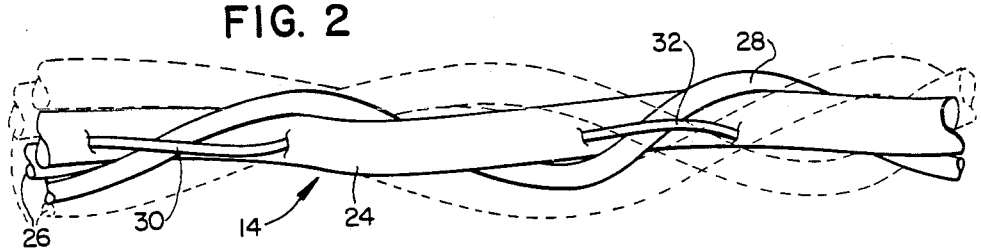
FIG. 2 is a schematic partial side elevational view showing a strand marked in accordance with the present invention, woven under substrands of a load bearing strand of a cord incorporated in the net of FIG. 1.

As depicted in FIG. 2, cord 14 comprises a multiplicity of strands including a central load bearing strand 24, a plurality of other load bearing strands 26 twisted about the central strand, and a non-load-bearing identification strand 28. Strand 28 is woven under substrands of central strand 24 at spaced points, such as points 30 and 32, along the length of central strand 24. The connection of identification strand 28 to central strand 24 at spaced points or locations therealong prevents or at least inhibits the removal of strand 28 from cord 14 along substantial segments thereof. However, in many cases, depending on the physical characteristics of strands 26 and the structure of cord 14, the outside strands 26 may be untwisted at any position along cord 14 to enable inspection of identification strand 28 and determination of markings or identification codes thereon.

Figure 3:
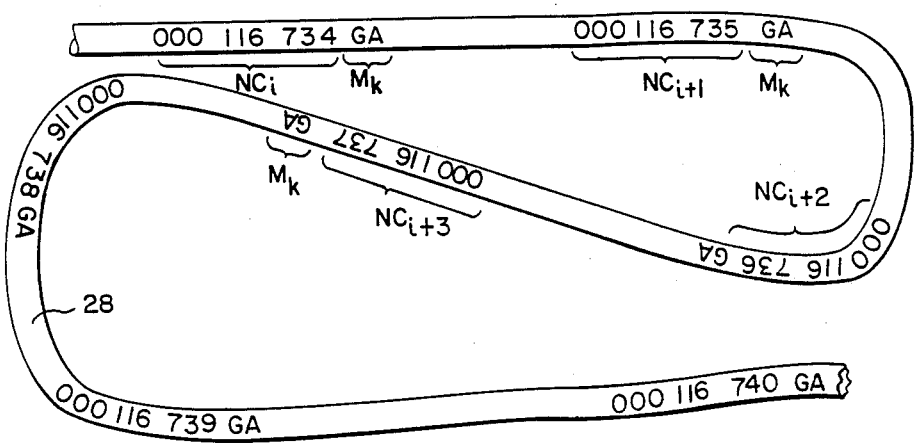
FIG. 3 is a side elevational view of a portion of a strand or tape of FIG. 2, showing identification markings in accordance with present invention.

As shown in FIG. 3, identification strand 28 may take the form of a tape indelibly marked at equispaced intervals or unequal intervals less than some maximum interval with sequential numerical codes $NC_i$, $NC_{i+1}$, $NC_{i+2}$, $NC_{i+3}$ . . . , each numerical code taking the form of decimal number. The numerical codes $NC_i$, $NC_{i+1}$ . . . may each be associated with a common symbol or mark $M_k$ placed with the numerical codes on strand 28 at the spaced intervals therealong. The common mark advantageously constitutes the trademark of the manufacturer of identification strand 28 or of the net. When strand 28 takes the tape form, as shown in FIG. 3, numerical codes $NC_i$, $NC_{i+1}$ . . . are advantageously indelibly marked into the surface of the tape.

Figure 4:
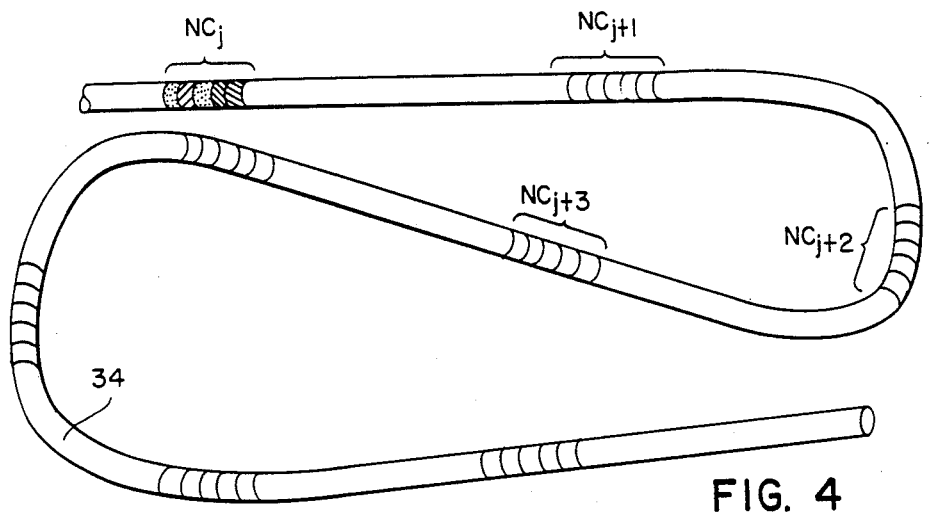
FIG. 4 is a side elevational view similar to FIG. 3 of another strand marked in accordance with the present invention.

As shown in FIG. 4, an identification strand 34 incorporated in a cord of a net in accordance with the present invention may take a cylindrical form provided at intervals therealong with color-coded numerical codes $NC_j$, $NC_{j+1}$, $NC_{j+2}$, $NC_{j+3}$ . . . Identification strand 34 may be a load bearing strand indistinguishable from other strands in the respective cord except for the numerical code markings $NC_j$, $NC_{j+1}$ . . . . Each color coded numerical code $NC_j$, $NC_{j+1}$ . . . may comprise a pattern of colored dyes in such a way that each pattern can be associated with a unique number and the marks can be placed on the strand so that the numbers form a recognizable sequence, for example, the counting sequence of positive integers. In some applications, numerical codes $NC_j$, $NC_{j+1}$ . . . may be associated with a common trademark or other symbol affixed to strand 34 in juxtaposition to each numerical code.

In a method of manufacturing fishing gear in accordance with the present invention, identification strand 28 or 34 is marked at spaced intervals therealong with sequential numerical codes $NC_i$, $NC_{i+1}$ . . . or $NC_j$, $NC_{j+1}$ . . . The same or another manufacturer inextricably incorporates the marked strand 28 or 34 in cord 14 so that strand 28 or 34 extends along the length of the cord. If the identification strand is not a load bearing strand (strand 28), the strand is advantageously woven or otherwise bonded to a load bearing strand of cord 14 as set forth hereinabove. Cord 14 is then incorporated, exemplarily sewn, into net 12 so cord 14 extends from one end 16 of the net to an opposing 18 thereof. Ends 20 and 22 of cord 14 are located readily accessible preselected points relative to net 12 so that a smallest numerical code and a largest numerical code on cord 14 are easily determinable upon visual inspection of the net.

Upon reading the smallest numerical code (i.e., the lowest number) and the largest numerical code (i.e., the highest number), an inspector determines the range of numerical codes or marks which occur in the cord 14 included in net 12. Any cord later found to contain any of the marks within the determined range can be identified as coming from fishing net 12.

Advantageously, a net may have a head line made of such sequentially marked cord. The two ends of the head line will contain the earliest and latest marks and inspection of those two ends will suffice to permit identification of any substantial piece of head line which is ever recovered. Inasmuch as the head line is ordinarily sewn into the net in such a way as to become an integral part of the net, it will serve to identify the gear.

It is to be noted that identification marks or codes provided on an exterior surface of cord 14 are undesirable because they are vulnerable to intentional defacement and subject to alteration or obliteration as the cord wears. Accordingly, it is desirable to apply identification codes or marks to a strand lying inside the cord, as described hereinabove. Many kinds of cord have small spaces between load bearing strands which can accommodate a small non-load-bearing strand carrying the marks. Cord 14, when made of certain materials, can be untwisted to a sufficient extent to allow inspection of strand 28 at any point without damaging the cord. Although this feature is advantageous, it is not essential inasmuch as provision can be made during manufacture of fishing net 12 to expose the marked strand at each end of the cord. So exposing the ends of the marked strand will permit inspection of gear which is either for sale or in service. When a fragment is recovered from a beach or from the open sea there will be no objection to destruction of a portion of the fragment to enable inspection of the identification codes.

Identification codes may be applied to an identification strand by any method which is effective and compatible with the strands other requirements. Accordingly, a load bearing strand may not employ a means of marking which reduces the strength of the strand to an unacceptable degree.

It is anticipated that a cord manufacturer will apply successive marks to all cord manufactured, without ever duplicating an identification mark or code, while distinguishing the manufacturer, identification marks in some way from those made by other manufacturers. The use of the manufacturers trademark serves to provide a means of distinguishing cord produced by different manufacturers.

In order to assure that any substantial piece of cord will contain at least one complete and legible identification code or mark, the codes should occur frequently along the cord, exemplarily at distances of one foot. In order to avoid duplication of identification codes, the data capacity of the ssequential field must be large enough to enumerate all of the marked intervals of cord produced during the lifetime of the cord. Thus, if a hundred million feet of cord are to be produced, and the cord is to be marked every foot, then the data capacity of the sequential field must exceed one-hundred million.

Upon inspection of a net prior to the use thereof by a new owner, the net is registered by recording the owner's name and the range of numerical codes including associated non-numerical marks (trademarks), if any, in an official data storage facility.

Although the invention has been described in terms of particular embodiments applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method of manufacturing fishing gear, comprising the steps of:
   marking a preselected strand at spaced intervals with sequential numerical codes;
   substantially inextricably incorporating said preselected strand in a cord of a multiplicity of strands so that said preselected strand extends along the length of said cord;
   incorporating said cord in a net so that said cord extends substantially from one end of said net to an opposite end thereof; and
   locating ends of said cord at readily accessible preselected points relative to said net so that a smallest numerical code and a largest numerical code on said cord are easily determinable upon visual inspection of said net.

2. The method defined in claim 1 wherein said intervals are equally spaced along said preselected strand.

3. The method defined in claim 1 wherein said numerical codes are each associated with a common mark placed with said numerical codes on said preselected strand at said spaced intervals therealong.

4. The method defined in claim 3 wherein said common mark constitutes a trademark.

5. The method defined in claim 1 wherein said step of inextricably incorporating includes the step of connecting said preselected strand to at least one other strand in said cord.

6. The method defined in claim 5 wherein said step of connecting includes the step of weaving said preselected strand under substrands of a load bearing strand of said cord.

7. The method defined in claim 1 wherein said preselected strand takes the form of a tape, said numerical codes being indelibly marked into said tape.

8. The method defined in claim 1 wherein said cord forms a head line of said net.

9. The method defined in claim 8 wherein the step of incorporating said cord in said net comprises the step of sewing said cord into said net so that said cord becomes an integral part of said net.

10. The method defined in claim 1 wherein said step of locating comprises the steps of disposing ends of said cord along edges of said net.

11. The method defined in claim 1 wherein said numerical codes take the form of color codes.

12. The method defined in claim 1 wherein said numerical codes include decimal digits.

13. The method defined in claim 1 wherein said intervals are spaced at intervals which may be unequal but some intervals are limited to less than some maximum interval.

14. A method of manufacturing fishing gear, comprising the steps of:
   providing a cord of a multiplicity of strands including a preselected strand marked at spaced intervals with sequential numerical codes, said preselected strand being substantially inextricably incorporated in said cord so that said preselected strand extends along the length of said cord;
   incorporating said cord in a net so that said cord extends substantially from one end of said net to an opposite end thereof; and
   locating ends of said cord at readily accessible preselected points relative to said net so that a smallest numerical code and a largest numerical code on said cord are easily determinable upon visual inspection of said net.

15. The method defined in claim 14 wherein said intervals are equally spaced along said preselected strand.

16. The method defined in claim 14 wherein said numerical codes are each associated with a common mark placed with said numerical codes on said preselected strand at said spaced intervals therealong.

17. The method defined in claim 16 wherein said common mark constitutes a trademark.

18. The method defined in claim 14 wherein said step of inextricably incorporating includes the step of connecting said preselected strand to at least one other strand in said cord.

19. The method defined in claim 18 wherein said step of connecting includes the step of weaving said preselected strand under substrands of a load bearing strand of said cord.

20. The method defined in claim 14 wherein said preselected strand takes the form of a tape, said numerical codes being indelibly marked into said tape.

21. The method defined in claim 14 wherein said cord forms a head line of said net.

22. The method defined in claim 21 wherein the step of incorporating said cord in said net comprises the step of sewing said cord into said net so that said cord becomes an integral part of said net.

23. The method defined in claim 14 wherein said step of locating comprises the steps of disposing ends of said cord along edges of said net.

24. The method defined in claim 14 wherein said numerical codes take the form of color codes.

25. The method defined in claim 14 wherein said numerical codes include decimal digits.

26. A method of manufacturing a cord to be incorporated in fishing gear, comprising the steps of:

marking a preselected strand at spaced intervals with a progressive sequence of non-repeating numerical codes;

substantially inextricably incorporating said preselected strand in a cord of a multiplicity of strands so that said preselected strand extends along the length of said cord, said step of inextricably incorporating including the step of connecting aid preselected strand to at least one other strand in said cord; and incorporating said cord in a net so that the cord extends substantially from one end of the net to an opposite end thereof.

27. The method defined in claim 26 wherein said step of connecting includes the step of weaving said preselected strand under substrands of a load bearing strand of said cord.

28. The method defined in claim 26 wherein said preselected strand takes the form of a tape, said numerical codes being indelibly marked into said tape.

29. The method defined in claim 26 wherein said intervals are equally spaced along said preselected strand.

30. The method defined in claim 26 wherein said numerical codes are each associated with a common mark placed with said numerical codes on said preselected strand at said spaced intervals therealong.

31. The method defined in claim 30 wherein said common mark constitutes a trademark.

32. The method defined in claim 26 wherein said numerical codes take the form of color codes.

33. The method defined in claim 26 wherein said numerical codes include decimal digits.

34. Fishing gear comprising a net having a cord of a multiplicity of strands including a preselected strand marked at spaced intervals with sequential numerical codes, said preselected strand being substantially inextricably incorporated in said cord so that said preselected strand extends along the length of said cord, said cord being incorporated in said net so that said cord extends substantially from one end of said net to an opposite end thereof, said cord having ends located at readily accessible preselected points relative to said net so that a smallest numerical code and a largest numerical code on said cord are easily determinable upon visual inspection of said net.

35. The fishing gear defined in claim 34 wherein said intervals are equally spaced along said preselected strand.

36. The fishing gear defined in claim 34 wherein said numerical codes are each associated with a common mark placed with said numerical codes on said preselected strand at said spaced intervals therealong.

37. The fishing gear defined in claim 36 wherein said common mark constitutes a trademark.

38. The fishing gear defined in claim 34 wherein said preselected strand is connected to other strands in said cord.

39. The fishing gear defined in claim 38 wherein said preselected strand is woven under substrands of a load bearing strand of said cord.

40. The fishing gear defined in claim 34 wherein said preselected strand takes the form of a tape, said numerical codes being indelibly marked into said tape.

41. The fishing gear defined in claim 34 wherein said cord forms a head line of said net.

42. The fishing gear defined in claim 41 wherein the said cord is sewn into said net so that said cord is an integral part of said net.

43. The fishing gear defined in claim 34 wherein said ends of said cord are disposed along edges of said net.

44. The fishing gear defined in claim 34 wherein said numerical codes take the form of color codes.

45. The fishing gear defined in claim 34 wherein said numerical codes include decimal digits.

46. A cord to be incorporated in fishing gear, comprising a multiplicity of stands including a preselected strand marked at spaced intervals over its length with a progressive sequence of non-repeating numerical codes, said preselected strand being substantially inextricably incorporated in said cord so that said preselected strand extends along the length of said cord, said preselected strand being connected to at least one other strand in said cord.

47. The cord defined in claim 46 wherein said preselected strand is woven under substrands of a load bearing strand of said cord.

48. The cord defined in claim 46 wherein said preselected strand takes the form of a tape, said numerical codes being indelibly marked into said tape.

49. The cord defined in claim 46 wherein said intervals are equally spaced along said preselected strand.

50. The cord defined in claim 46 wherein said numerical codes are each associated with a common mark placed with said numerical codes on said preselected strand at said spaced intervals therealong.

51. The cord defined in claim 50 wherein said common mark constitutes a trademark.

52. The cord defined in claim 46 wherein said numerical codes take the form of color codes.

53. The cord defined in claim 46 wherein said numerical codes include decimal digits.

* * * * *

UNITED STATES PATENT AND TRADEMARK OFFICE
CERTIFICATE OF CORRECTION

PATENT NO.   : 4,876,818
DATED        : 31 OCTOBER 1989
INVENTOR(S)  : Richard D. FRALICK et al.

It is certified that error appears in the above-identified patent and that said Letters Patent is hereby corrected as shown below:

| Column | Line | Corrections |
|--------|------|-------------|
| 3 | 7 | Change "exemplify" to --exemplarily--. |
| 4 | 39 | Change "opposing" to --opposite end--. |
| 5 | 14 | Change "strands" to --strand's--. |
| 5 | 21 | Change "manufacturer," to --manufacturer's--. |
| 5 | 23 | Change "manufacturers" to --manufacturer's--. |
| 5 | 31 | Change "ssequential" to --sequential--. |
| 7 | 28 | Change "aid" to --said--. |

Signed and Sealed this

Eighteenth Day of December, 1990

Attest:

HARRY F. MANBECK, JR.

*Attesting Officer*           *Commissioner of Patents and Trademarks*